United States Patent
Olderdissen et al.

(10) Patent No.: US 9,189,493 B2
(45) Date of Patent: *Nov. 17, 2015

(54) OBJECT FILE SYSTEM

(71) Applicant: DataDirect Networks, Inc., Chatsworth, CA (US)

(72) Inventors: Jan Olderdissen, Thousand Oaks, CA (US); Dan Olster, Woodland Hills, CA (US); Craig Robertson, Simi Valley, CA (US); Doug Schafer, Agoura Hills, CA (US); Dave Fellinger, Westlake Village, CA (US)

(73) Assignee: DataDirect Networks, Inc., Chatsworth, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/498,917

(22) Filed: Sep. 26, 2014

(65) Prior Publication Data

US 2015/0019598 A1 Jan. 15, 2015

Related U.S. Application Data

(63) Continuation of application No. 12/873,137, filed on Aug. 31, 2010, now Pat. No. 8,849,877.

(51) Int. Cl.
 G06F 17/30 (2006.01)
 G06F 11/10 (2006.01)
 H04L 29/08 (2006.01)

(52) U.S. Cl.
 CPC ...... *G06F 17/30182* (2013.01); *G06F 11/1076* (2013.01); *G06F 17/30218* (2013.01); *H04L 67/1097* (2013.01); *G06F 17/30864* (2013.01); *G06F 2211/1038* (2013.01)

(58) Field of Classification Search
 CPC .......... G06F 11/1076; G06F 17/30182; G06F 17/30218; G06F 17/30864; G06F 2211/1038; H04L 67/1097
 USPC ......................................................... 707/823
 See application file for complete search history.

(56) References Cited

U.S. PATENT DOCUMENTS 4,092,732 A 5/1978 Ouchi
4,761,785 A 8/1988 Clark et al.

(Continued)

OTHER PUBLICATIONS

Rodrigues et al., "High Availability in DHTs: Erasure Coding vs. Replication", Peer-to-Peer Systems IV 4th International Workshop IPTPS 2005 Published Feb. 2005, accessed May 9, 2013, http://pmg.csail.mit.edu/papers/rodrigo_IPTPS05.pdf.

(Continued)

*Primary Examiner* — Shahid Alam
(74) *Attorney, Agent, or Firm* — SoCal IP Law Group LLP; Mark A. Goldstein

(57) ABSTRACT

An object based file system for storing and accessing objects is disclosed. The file system may be implemented as a method in hardware, firmware, software, or a combination thereof. The method may include receiving from an application program an object write request. A selected storage node on which to store the object may be selected, including identifying a least busy storage node and/or a least full storage node. The object and the object write request may be sent to the selected storage node. A write success message may be received from the selected storage node. The successful writing of the object may be reported to the application program.

21 Claims, 8 Drawing Sheets

(56) References Cited

U.S. PATENT DOCUMENTS

| | | | |
|---|---|---|---|
| 5,208,813 | A | 5/1993 | Stallmo |
| 5,390,187 | A | 2/1995 | Stallmo |
| 5,504,892 | A | 4/1996 | Atsatt et al. |
| 5,758,153 | A | 5/1998 | Atsatt et al. |
| 6,154,853 | A | 11/2000 | Kedem |
| 6,442,659 | B1 | 8/2002 | Blumenau |
| 6,658,439 | B2 | 12/2003 | Karasudani |
| RE39,421 | E | 12/2006 | Stolowitz |
| 7,529,970 | B2 | 5/2009 | Hartline et al. |
| 7,734,643 | B1 | 6/2010 | Waterhouse et al. |
| 2001/0016841 | A1 | 8/2001 | Karasudani |
| 2002/0178162 | A1 | 11/2002 | Ulrich et al. |
| 2003/0115438 | A1 | 6/2003 | Mahalingam et al. |
| 2004/0098383 | A1 | 5/2004 | Tabellion et al. |
| 2004/0107314 | A1 | 6/2004 | Kim et al. |
| 2004/0236769 | A1 | 11/2004 | Smith et al. |
| 2005/0216502 | A1 | 9/2005 | Kaura et al. |
| 2009/0106255 | A1 | 4/2009 | Lacapra et al. |
| 2009/0198719 | A1 | 8/2009 | DeWitt |
| 2010/0180153 | A1 | 7/2010 | Jernigan et al. |
| 2010/0218037 | A1 | 8/2010 | Swartz et al. |
| 2010/0223495 | A1 | 9/2010 | Leppard |
| 2011/0153977 | A1 | 6/2011 | Root et al. |
| 2011/0196900 | A1 | 8/2011 | Drobychev et al. |
| 2011/0219048 | A1 | 9/2011 | Cross et al. |
| 2011/0276622 | A1 | 11/2011 | Knapp et al. |
| 2012/0030736 | A1 | 2/2012 | Resch et al. |
| 2013/0346532 | A1 | 12/2013 | D'Amato et al. |

OTHER PUBLICATIONS

Huang et al., "Erasure Coding in Windows Azure Storage", Microsoft Corporation, 2012 Usenic best paper, accessed May 9, 2013, http://research.microsoft.com/en-us/um/people/yekhanin/Papers/UsenixATC_2012.pdf.

Gsoedl, "Inside object-based storage", SearchStorage.com, article published Jun. 2012, accessed Oct. 5, 2012, http://searchstorage.techtarget.com/magazineContent/Inside-object-based-storage?vgnextfmt=print, pp. 1-3.

Gsoedl, "Advantages of using an object storage system", SearchStorage.com, article published Jul. 30, 2012, accessed Oct. 5, 2012, http://searchcloudstorage.techtarget.com/tip/Advantages-of-using-an-object-storage-system?gnextfmt=print, pp. 1-3.

Primmer, "Distributed Object Store Principles of Operation: The Case for Intelligent Storage", White Paper, Published Jul. 2010 by Hitachi Data Systems, total of 20 pages.

Terrace et al., "Object Storage on CRAQ, High-throughput chain replication for read-mostly workloads", In Proc. USENIX Annual Technical Conference, San Diego, CA, Jun. 2009, total of 16 pages.

Taylor, "Object-based storage promises scalability and flexibility for static, unstructured data needs", SearchStorage.co.UK, Apr. 11, 2011, total of 2 pages.

Slack, "Object-based storage for cloud storage: Product assessments", searchCloudProvider.com, published Oct. 26, 2010, 2 total pages.

Slack, "Object storage: Object-based storage devices challenge file systems for unstructured data sets", SearchStorageChannel.com, published Sep. 22, 2010, 2 total pages.

Carns et al., "Object storage semantics for replicated concurrent-writer file systems", journal, Argonne National Laboratory, accessed Oct. 5, 2012, http://www.mcs.anl.gov/events/workshops/iasds10/carns_iasds2010.pdf.

Factor et al., "Object Storage: The Future Building Block for Storage Systems", A Position Paper, IBM Haifa Research Laboratories, pp. 101-105, accessed Oct. 5, 2012, https://www.research.ibm.com/haifa/projects/storage/objectstore/papers/PositionOSD.pdf.

Rackspace, Inc., "CloudFiles Introduction", Jan. 24, 2011, 13 total pages.

DataDirect Networks, Inc., "Web Object Scaler", Brochure, Mar. 9, 2010, total of 4 pages.

Connor et al., "Cloud Storage: Adoption, Practice and Deployment", Storage Strategies NOW, Outlook Report, Published Apr. 4, 2011, total of 112 pages.

Berriman, et al., Netapp Raid-DP: Dual-Parity Raid 6 Protection Without Compromise, WP-7005-1006, Oct. 2006, pp. 1-11.

Celeros, Bringing SANity to Storage Costs, RAID White Paper, Jan. 2007.

Chen et al., RAID: High-Performance, Reliable Secondary Storage, AMC Computing Surveys, vol. 26, No. 2, Jun. 1994, pp. 145-185.

DataDirect Networks, DataDirect Networks S2A9550: High-Performance, Resilient Storage for High-Performance Computing (HPC), White Paper, Sep. 2007, pp. 1-12.

DataDirect Networks, Best Practices: Enterprise SATA Deployment with High Performance and Reliability, White Paper, Dec. 2007, pp. 1-12.

EMC, EMC CLARiiON Raid 6 Technology, White Paper, Jul. 2007, pp. 1-14.

MPSTOR, RAID 50 Interleave, White Paper, Xtore Extreme Storage, Nov. 2006, pp. 1-13.

Patterson, et al., A Case for Redundant Arrays of Inexpensive Disks (RAID), Computer Science Division, Department of Electrical Engineering and Computer Sciences, pp. 1-25.

Pivot3, Pivot3 RAIGE Storage Cluster, White Paper, Technology Overview, Feb. 2007, pp. 1-18.

Storage, Best Storage Products of 2007, issued Feb. 2008, accessed on Apr. 22, 2008, http://searchstorage.techtarget.com/magazinePrintFriendly/0,296905,sid5_gci1299110,00.html.

WinchesterSystems, Technology Update White Paper "Enterprise RAID 6", May 4, 2006, pp. 1-14.

Du, et al., Experiences Building and Object-Based Storage System Based on the OSD T-10 Standard, DTC Intellient Storage Consortium, University of Minnesota, 2006, pp. 1-11.

Moore, et al., Storage Resource Broker Global Data Grids, San Diego Supercomputer Center, 2006, pp. 1-12.

Devulapalli, et al., Integrating Parallel File Systems with Object-Based Storage Devices, Ohio Supercomputer Center, pp. 1-10.

Smolik, An Opject-Oriented File System—An Example of Using the Class Hierarchy Framework Concept, Department of Computer Sciences, University of Missouri—Rolla, pp. 33-53.

Olson, et al., Secure Capabilities for a Petabyte-Scale object-Based Distributed File System, Storage System Research Center, Computer Science Department, University of California, Santa Cruz, pp. 64-73.

Marsden et al., improving the Usability of the Hierarchical File System, Department of Computer Science, University of Cape Town and University of Stirling, Proceedings of SAICSIT 2003, pp. 122-129.

Gaffey, SGI's Cluster File System—CXFS, File Systems Engineering, Apr. 9, 2000, slides 1-56.

Foster, Global data Services, Developing Data-Intensive Applications Using Globus Software, Computation Institute Argonne National Lab & University of Chicago, slides 1-114.

Pollack et al., Efficient Access Control for Distributed Hierarchical File Systems, University of California, Santa Cruz, slides 1-9.

Pollack et al., Efficient Access Control for Distributed Hierarchical File Systems, University of California, Santa Cruz, 2005, Journal, pp. 101-108.

Shinkai et al., Alternative Implementations of Cluster File Systems, MMS Conference, Mar. 2000, slides 1-16.

Rogers et al., z/OS Distributed File Service zSeries File System Implementation z/OS V1R11, Oct. 2009, Redbooks, IBM, International Technical Support Organization, Draft Document, Nov. 24, 2009, pp. 1-458.

Pike et al, The Styx Architecture for Distributed Systems, Computing Science Research Center, Bell Labs Technical Journal, vol. 4, No. 2, Apr.-Jun. 1999, pp. 1-11.

Welch et al., Object-Based Cluster Storage Systems, Panasas, Inc., May 25, 2006, slides 1-104.

OBJECT FILE SYSTEM

RELATED APPLICATION INFORMATION

This patent is a continuation of U.S. application Ser. No. 12/873,137 filed Aug. 31, 2010 entitled OBJECT FILE SYSTEM, now U.S. Pat. No. 8,849,877 issued Sep. 30, 2014.

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

1. Field

This disclosure relates to the organization of electronic files in a file system and accessing those files on a storage medium.

2. Description of the Related Art

A file system is used to store and organize computer data including files. File systems allow data and files to be found, read, deleted, and otherwise accessed. File systems store data on one or more storage devices. File systems store data and address data in units typically called clusters or blocks. Popular file systems include FAT and FAT-32, short for File Allocation Table; NTFS, short for NT File System, used on Microsoft Windows operating systems; MFS, a TiVo proprietary file system, short for Media File System; UFS, short for Unix File System, and many others.

Web applications may store large numbers of documents, images, videos and other object-like agglomerations of data. This can be implemented with a distributed hierarchical file system that includes a database to store information about stored objects.

DETAILED DESCRIPTION

Environment

Figure 1:
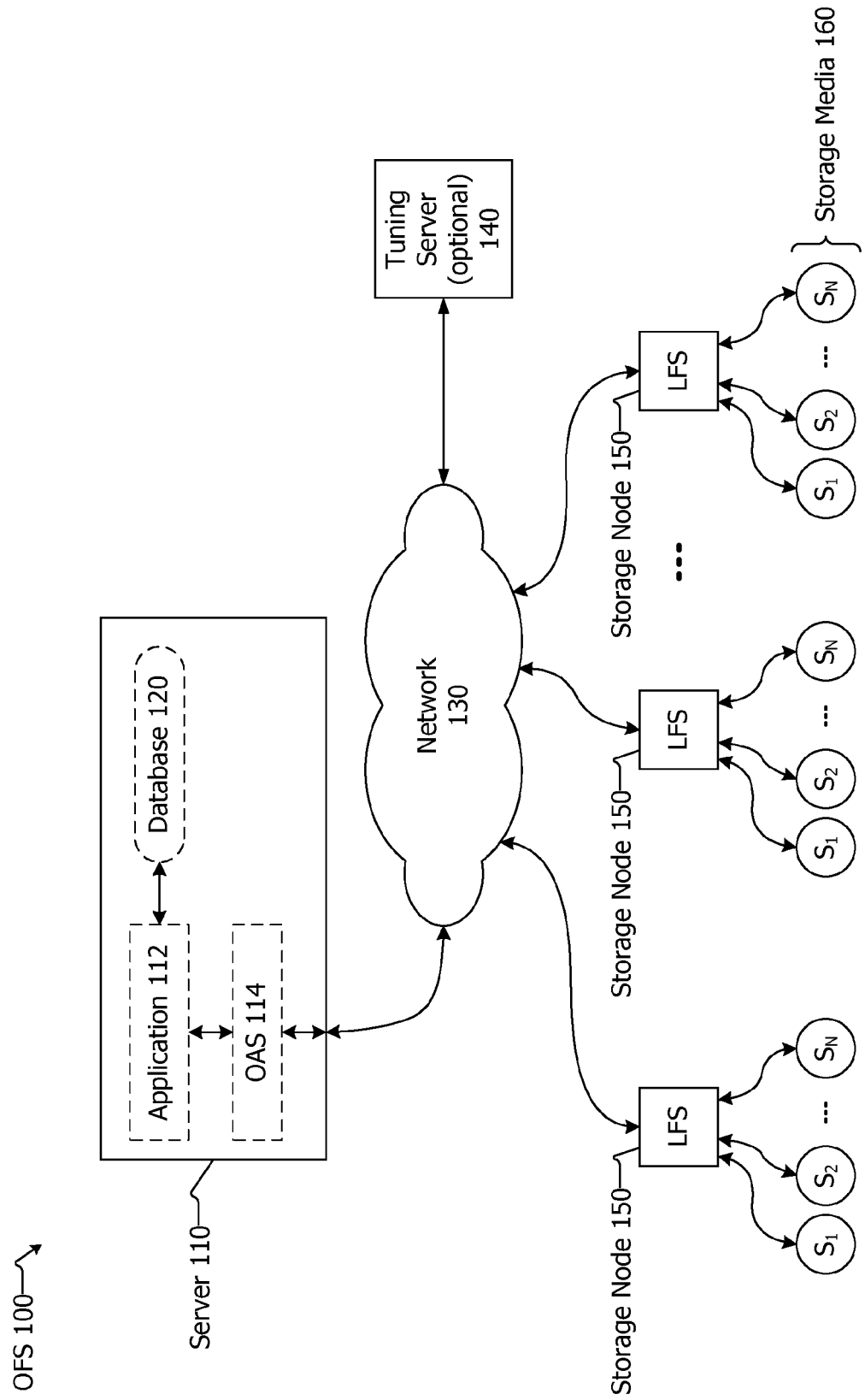
FIG. 1 is a block diagram of a first embodiment of an object file system.

FIG. 1 is a block diagram of a first embodiment of an object file system 100. A server 110 may include an application program 112 which accesses data. As used herein, the term application refers to software that executes at the highest layer of the Open System for Interconnection (OSI) model. Some applications may store a large amount of data. Such applications include, for example, the software used to run social networking websites (e.g., facebook.com), photo sharing websites (e.g., flickr.com), newspaper and magazine websites (e.g., nytimes.com and life.com), scientific lab data capturing and analysis programs, video and film creation software, and others. Applications may store data in the form of objects on an object file system (OFS).

The term data as used herein includes a bit, byte, word, block, stripe or other unit of information. Data may represent the information for an object. As used herein, an object refers to a group of data that is a file or portion of a file that represents text, numbers, data, images, photographs, graphics, audio, video, and/or a combination of these. Many data intensive applications store a large quantity of data and read or access the data in frequently or in a limited fashion.

The object file system provides only limited access to stored data. Only a limited command set is supported by the OFS. In one embodiment, the OFS supports only three commands: put (that is, write or store or set), get (that is, read) and delete. The OFS may also support two additional commands: reserve to reserve space for an object, and reserve write to write the reserved object. To read, write and delete data stored on the object file system, the application program 112 may communicate with an object access system (OAS) program or interface or module 114 on the server 110. The application program 112 makes calls to or uses the object access system 114 to read, write and delete objects stored on the storage nodes 150. The OAS 114 may provide a proprietary or well known standards based interface to the application 212.

The application 112 may read, write and delete information about stored objects in a database 120 included on or coupled with the server 110. In other embodiments, the database 120 may be on a database server directly coupled to the server 110 or accessible over network 130 by server 110.

The server 110 may communicate with one or more groups of storage nodes 150 over a network 130. More specifically, the application program 112 makes calls to or uses object access system software 114 to read, write and delete objects stored on the storage nodes 150. The storage nodes 150 may each run a local file system (LFS). The OAS 114 provides an interface to the LFS on the storage nodes 150.

The LFS may be an off the shelf, commonly used file system or it may be a proprietary file system. Example off the shelf, commonly used file systems include the Network File System (NFS), Common Internet File System (CIFS), and others as well as using Web-based Distributed Authoring and Versioning (webDAV) to manage and access files stored according to file systems such as fourth extended files system (ext4), New Technology File System (NTFS) and others. When the LFS is a proprietary file system, it may be written to include features and parameters set to enhance the performance of accessing objects. In another embodiment, the server 110 may be coupled directly with one or more groups of storage nodes 150. Each of the storage nodes 150 include a plurality of storage media 160. The storage media 160 in a storage node 150 may take various configurations, and may include multiple RAID systems. Each of the storage nodes 150 include object file system software which controls access to the storage media 160.

Database 120 may be used to store information about the objects stored in the storage nodes 150 of the object file system. The database may be a relational database. The database 120 holds object identifiers for stored objects (shown in FIG. 3 as 300 and described below). The database 120 may also include meta data about the objects, namely contextual or control information including, but not limited to, an object type such as, for example, video, audio, photo, text, etc.; the creator of the object; the owner of the object; access permissions; creation time; last access time; etc. The meta data may be stored as key-value pairs. In some embodiments the meta data is searchable. That is, in some embodiments, the application 112 may search for objects according to the meta data about objects included in the database 120.

The object file system may optionally include a tuning server 140. The tuning server 140 retains overall knowledge of the cluster of storage nodes 150 included in the object file system 100. The tuning server 140 is not in the primary data path for object reads or writes. The tuning server's role may include, but is not limited to, making dynamic adjustments in data placement to balance storage node capacity or improve performance. The tuning server 140 may run on separate hardware from the storage nodes 150, as shown, or it may run on one or more of the storage nodes 150. The role of the tuning server 140 may be distributed across some or all storage nodes, and aspects of this role may be specialized among distinct storage nodes 150. The tuning server 140 may have access to backups designated within the system to access in the event of a system impairment, such as, for example, a storage node failure, network failure, etc.

The network 130 may be a local area network (LAN), a wide area network (WAN), a storage area network (SAN), or a combination of these. The network 130 may be wired, wireless, or a combination of these. The network 130 may include or be the Internet. The network 130 may be public or private, may be a segregated network, and may be a combination of these. The server 110 and storage nodes 150 may be connected to the network by wire lines, optical fiber cables, wireless communication connections, and others, and may be a combination of these.

In a related embodiment, the OAS 114 is not located on a server 110 but is distributed among each of the storage nodes 150. In this version, the storage nodes access a database on a server or a database coupled with the network 130. In this version, the application 112 accesses the OAS on the storage nodes to obtain object IDs using a standard protocol, such as, for example, HTTP.

Figure 2:
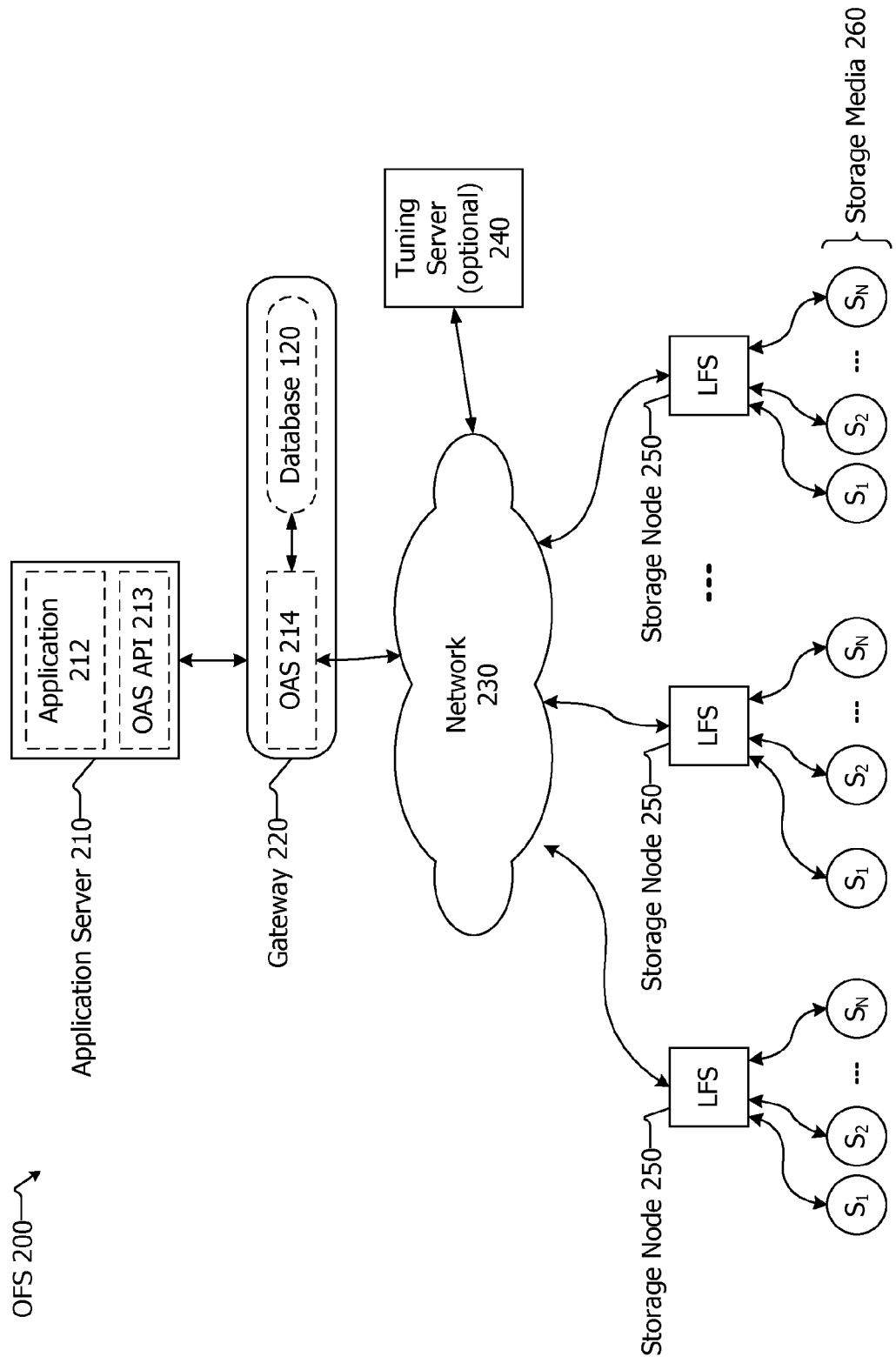
FIG. 2 is a block diagram of a second embodiment of an object file system.

FIG. 2 is a block diagram of a second embodiment of an object file system. An application server 210 may include an application program 212 which accesses data. The data may be stored on an object file system. To read, write and delete data stored on the object file system, the application program 212 may communicate with the object file system through an object access system application program interface (API) 213 which executes on the application server 210. The OAS API 213 may be a program, a module or merely an interface library, depending on the embodiment. In this embodiment, the application program 112 makes calls to the object access system API 213 to read, write and delete objects on the storage nodes 250. The OAS API 213 and the OAS program 214 may provide a proprietary, well known, or standards based interface to the application 212. The object access system API 213 communicates with the object access system program 214 that resides on a gateway 220. The gateway 220 may be implemented using a server computer or other computing device. The application server 210 may be coupled directly with the gateway 220, as shown, or may communicate with the gateway 220 over a network such as network 230. In another embodiment, the OAS API 213 is not included in the application server 210. In this embodiment, the application 212 directly accesses the OAS program 214 on gateway 220.

In another embodiment, not shown, there is no gateway 220, and the features and functionality of the OAS program 214 are included in whole in one of the storage nodes 250 or may be included in each of the storage nodes 250. In these embodiments, the database 120 would be included in or coupled with one or more of the storage nodes 250.

The OAS program 214 may read, write and delete information about stored objects in a database 222 included on or coupled with the gateway 220. The gateway 220 provides a specialized interface to the storage nodes 250. The gateway 220 may communicate with one or more groups of storage nodes 250 over the network 230. In another embodiment, the gateway 220 may be coupled directly with one or more groups of storage nodes 250. Each of the storage nodes 250 include a plurality of storage media 260. Each of the storage nodes 250 include a local file system, LFS, described above, which controls access to the storage media 260.

Through the OAS 214 the OFS 200 may automatically adapt to impairments in the file system. That is, the OAS 214 may monitor and recognize storage node failures; storage device failures; storage nodes with diminished capacity such as one or more down or diminished drives; storage devices with diminished capacity such as bad blocks or sectors; other equipment failures; offline nodes; offline storage devices; and other system anomalies. When impairments are recognized, the OAS 214 may automatically adapt by accessing replicas or backups of objects, disfavoring diminished or unavailable storage nodes or storage devices, creating additional replicas on alternate storage nodes, or initiating additional backups.

The OAS 214 may automatically adapt to the addition of additional storage nodes and/or to the addition of storage devices to a storage node. When a new storage device is added to a storage node, the capacity of the storage node increases. The OAS 214 may automatically favor a storage node with new capacity for the storage of new objects or for the storage of replicas of objects. When a new storage device is added to a storage node, the OAS 214 may automatically redistribute or migrate objects from more full nodes to the node with added capacity. In this way, the OAS 214 may balance storage of objects among the storage nodes 250.

The object file system 200 may optionally include a tuning server 240. The tuning server 240 and/or the storage nodes 250 may perform the actions of the OAS 214 described in the prior two paragraphs in conjunction with or in place of the OAS 214.

The server computers 110 and 210, gateway 220, and tuning servers 140 and 240 may be specialized or general purpose computing devices, such as, for example, computing devices that operate as a server. The server may be a specialized server, such as an application server, a video server, a graphics server, an advertisement server, a database server, or other server.

The functionality and features of the object file system described herein may be implemented as a combination of software included in the server computers 110, 210 and 220, and optionally 140 and 240. The OFS may be accessed by applications 112 and 212 and be implemented as software such as OAS 114 and OAS API 213, and may include databases 120 and 222 and may optionally include tuning software included in tuning servers 140 and 240. In addition, a controller (not shown) included internally in or externally coupled with storage node 250 may contribute to the implementation of the methods described herein. As such, the object file system systems and methods described herein may be implemented as software, hardware, or firmware, or a combination of two or more of software, hardware and firmware.

The servers as well as storage nodes 150 and 250 may include one or more of logic arrays, memories, analog circuits, digital circuits, software, firmware, and processors such as microprocessors, a field programmable gate arrays (FPGAs), application specific integrated circuits (ASICs), programmable logic device (PLDs) and programmable logic array (PLAs). The hardware and firmware components of the servers and/or controller may include various specialized units, circuits, software and interfaces for providing the functionality and features described herein. The processes, functionality and features may be embodied in whole or in part in software which operates on a controller and/or one or more server computers and may be in the form of one or more of firmware, an application program, object code, machine code, an executable file, an applet, a COM object, a dynamic linked library (DLL), a script, one or more subroutines, or an operating system component or service, and other forms of software. The hardware and software and their functions may be distributed such that some components are performed by a controller, server or other computing device, and others by other controllers, servers or other computing devices.

A computing device as used herein refers to any device with a processor, memory and a storage device that may execute instructions such as software including, but not limited to, personal computers, server computers, computing tablets, set top boxes, video game systems, personal video recorders, telephones, personal digital assistants (PDAs), portable computers, and laptop computers. These computing devices may run an operating system, including, for example, versions of the Linux, Unix, MS-DOS, Microsoft Windows, Palm OS, Solaris, Symbian, Android, Chrome, and Apple Mac OS X operating systems. Computing devices may include a network interface in the form of a card, chip or chip set that allows for communication over a wired and/or wireless network. The network interface may allow for communications according to various protocols and standards, including, for example, versions of Ethernet, Infiniband® network, Fibre Channel, and others. A computing device with a network interface is network capable.

To store and provide data reliably to the requesting application, the storage media 160 and 260 of the object file system may be configured as Redundant Arrays of Inexpensive (or Independent) Disks. There are various configurations of RAID storage, including RAID 0, RAID 1, RAID 10, RAID 0+1, RAID 1+0, RAID 2, RAID 3, RAID 4, RAID 5, RAID 5+1, RAID 5+0, RAID 53, X-RAID®, G-RAID®, EZRAID®, SYNCRAID® systems, and others. Hard disk drives and/or other media may also be arranged according to other techniques as a group of disks and/or other media that have a backup or redundancy feature. The term "storage media" is used herein to refer to any configuration of hard disk drives, solid-states drives and magnetic tape.

Each of the storage nodes 150 and 250 typically includes multiple storage media, such as, for example, hard disk drives, silicon storage devices, and others. The storage media included in a storage node may be of the same capacity, may have the same physical size, and may conform to the same specification, such as, for example, a hard disk drive specification. Example sizes of storage media include, but are not limited to, 2.5" and 3.5". Example hard disk drive capacities include, but are not limited to, 500 Mbytes, 1 terabyte and 2 terabytes. Example hard disk drive specifications include Serial Attached Small Computer System Interface (SAS), Serial Advanced Technology Attachment (SATA), and others.

An example node may include 16 one terabyte 3.5" hard disk drives conforming to the SATA standard. In other configurations, the storage nodes may include more and fewer drives, such as, for example, 10, 12, 24 32, 40, 48, 64, etc. In other configurations, the storage media in a storage node may be hard disk drives, silicon storage devices, magnetic tape devices, or a combination of these. In some embodiments, the physical size of the media in a storage node may differ, and/or the hard disk drive or other storage specification of the media in a storage node may not be uniform among all of the devices in a storage node.

The storage media in a storage node may, but need not, be included in a single cabinet, rack, shelf or blade. When the storage media in a storage array are included in a single cabinet, rack, shelf or blade, they may be coupled with a backplane. A controller may be included in the cabinet, rack, shelf or blade with the storage devices. The backplane may be coupled with or include the controller. The controller may communicate with and allow for communications with the storage media according to a storage media specification, such as, for example, a hard disk drive specification. The controller may include a processor, volatile memory and non-volatile memory. The controller may be a single computer chip such as an FPGA, ASIC, PLD and PLA. The controller may include or be coupled with a network interface.

In one embodiment, a group of storage media arranged as a storage node may be included in a single cabinet or rack. In another embodiment, multiple storage nodes may be included in a single cabinet or rack. When in a single cabinet or rack, storage nodes or storage media may be coupled with a backplane. A controller may be included in the cabinet with the storage media and/or storage nodes. The backplane may be coupled with the controller. The controller may communicate with and allow for communications with the storage media. The controller may include a processor, volatile memory and non-volatile memory. The controller may be a single computer chip such as an FPGA, ASIC, PLD and PLA.

The rack, shelf or cabinet containing a storage node 150 and 250 may include a communications interface that allows for connection to a computing device and/or to a network. The communications interface may allow for the transmission of and receipt of information according to one or more of a variety of standards, including, but not limited to, universal serial bus (USB), IEEE 1394 (also known as Firewire® and i.link®), Fibre Channel, Ethernet, WiFi (also known as IEEE 802.11). The backplane or controller in a rack or cabinet containing one or more storage nodes 150 and 250 may include a network interface chip, chipset, card or device that allows for communication over a wired and/or wireless network, including Ethernet. In various embodiments, the storage node, controller or backplane may provide for and support 1, 2, 4, 8, 12, 16, etc. network connections and may have an equal number of network interfaces to achieve this.

The techniques discussed herein are described with regard to storage media including hard disk drives and solid-state drives (also known as silicon storage devices). The techniques may be implemented with other readable and writable storage media.

As used herein, a storage device is a device that allows for reading from and/or writing to a storage medium. Storage devices include hard disk drives (HDDs), solid-state drives (SSDs), DVD drives, flash memory devices, and other magnetic media, optical media, solid-state media and flash memory based storage devices. Storage media include magnetic media such as hard disks and tape, flash memory, and optical disks such as CDs, DVDs and BLU-RAY® discs.

Figure 3:
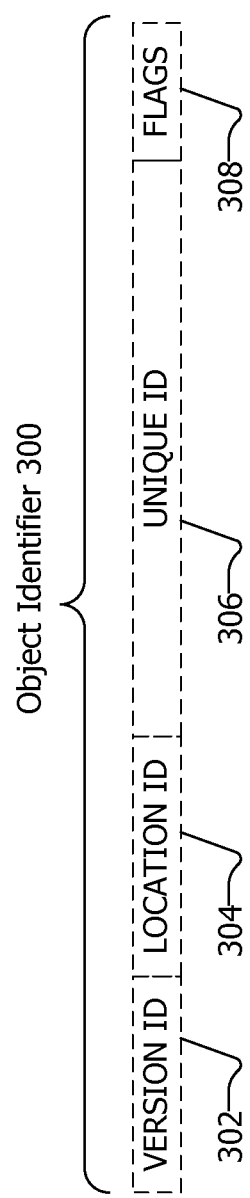
FIG. 3 is a block diagram of an embodiment of an object identifier.

Objects in the object file system are accessed by and identified by a unique object identifier. FIG. 3 is a block diagram of an embodiment of an object identifier 300. According to the object file system described herein, an object identifier 300 includes three components and may include four components: a version identifier 302, a location identifier 304, a unique identifier 306, and, optionally, flags 308. The version identifier 302 refers to a particular version of the object such that the system may have multiple copies or multiple versions of the same object stored in one or more locations in the file system. The version identifier 302 may be a simple integer and may be represented by a byte of data. The location identifier 304 specifies in which storage node or nodes an object resides. The location identifier 304 may be a simple integer and may be represented by a byte of data.

The location identifier 304 may include both a group identifier ("group ID") and an index. The group ID may refer to a grouping of objects. The grouping may be arbitrary or may reflect that those objects are stored in a related the same region, such as, for example, on a particular storage node or on a particular storage media such as a drive or storage device. The group ID may be used to map the object to a particular storage node or storage media, such as a hard disk drive. The mapping may be stored in a mapping file maintained by the object file system. The mapping information is distributed and is hierarchical. More specifically, the OAS stores a portion of mapping information in memory, and the storage nodes hold a portion of the mapping information in their memory. Master copies of the mapping information are kept on disk or other nonvolatile storage medium on the storage nodes. The master copies of the mapping information are dynamically updated to be consistent with any changes made while the system is active. The index may be the specific location of the object within the group. The index may refer to a specific location on disk or other storage device. The index may be a LUN identifier or LUN ID. The LUN ID may be an integer that identifies a particular LUN and is represented by a byte of data.

Hard disk drives and other storage media may store data as logical units or LUNs. A LUN includes multiple bits, bytes, words, blocks and stripes. The size of a LUN may be user configurable, system configurable, or system defined, and may be static or variable, depending on the embodiment of the storage medium. LUN size may be measured in, for example, bytes, megabytes, gigabytes, terabytes and blocks. In some embodiments, LUNs may be a few gigabytes in size or a few terabytes in size. Each LUN may be defined by the number of blocks it contains. Example LUN sizes include 128 blocks, 256 blocks, 1024 blocks, and others. Example block sizes include 512 bytes, 1024 bytes, 2048 bytes, 4096 bytes, and others. So, the location identifier 304 may, in one embodiment include a group ID and an index that may be a LUN ID.

The unique identifier 306 is a unique number or alphanumeric sequence that is used to identify the object on the particular medium. The unique identifier 306 may be randomly generated, may be the result of a hash function of the object, or may be created using another technique. The unique identifier 306 may be stored as 24 bits, 32 bits, 64 bits, 128 bits, etc. The total size of the object identifier may be, for example, 32 bits, 64 bits, 128 bits, etc. The unique identifier 306 is stored within the object itself.

The object identifier 300 may optionally include flags 308. Flags 308 may be used to distinguish between different types by providing additional characteristics or features of the object. The OAS may use the flags in evaluating whether to retrieve or delete objects.

In some embodiments, when the objects are large, the object may be broken into sub-objects. The flags 308 may be useful in the handling of large objects and their constituent sub-objects. Similarly, the group ID that may be included as part of the location ID 304, and may be used in mapping and reassembling the constituent parts of large objects.

Description of Processes

Figure 4:
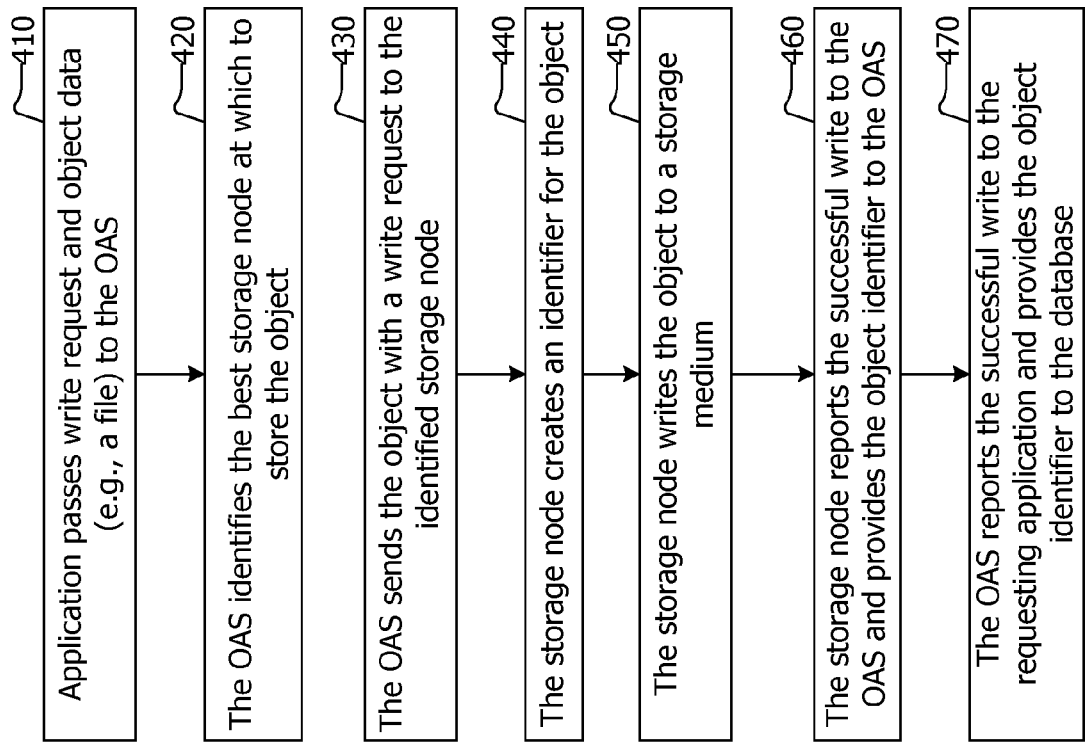
FIG. 4 is a flow chart of the actions taken to write an object to an object file system.

FIG. 4 is a flow chart of the actions taken to write (or put) an object to an object file system. Referring to the configuration shown and described regarding FIG. 1, an application passes a write request and object data (e.g., a file) to the OAS, as shown in block 410. The write request may also include meta data for and/or about the object. The OAS identifies the best storage node at which to store the object, as shown in block 420. The "best" node may be evaluated according to various criteria depending on the implementation and needs. For example, the "best" node may be the least used storage node, the most used (busiest) storage node, the most empty storage node, and others. The OAS sends the object data with a write request to the identified storage node, as shown in block 430. Again, the write request may include meta data about the object. The storage node creates an identifier for the object, as shown in block 440. The identifier is the object identifier 300 described and shown regarding FIG. 3. The storage node writes the object to a storage medium, as shown in block 450. The storage node reports successful write to the OAS and provides the object identifier to the OAS, as shown in block 460. The OAS then reports that the write was successful to the requesting application and provides the object identifier to the database, as shown in block 470. In addition, the OAS may also provide meta data about the object to the database. The database maintains information about the stored objects according to the object identifiers. The database may also store and maintain meta data about stored objects.

In one embodiment, when writing an object to a storage node, the object may be replicated on one or more additional storage nodes to provide for redundancy. The additional storage nodes written to may be selected according to user specified or system default schemes, including, for example, geographical diversity or storage node farthest away, least accessed storage node, least full storage node, or a combination of these and other criteria. The number of replicated copies may be user specified or system default, and may be 1, 2, 3, 5, etc. In one embodiment, the additional nodes written to may be selected by the OAS. In this embodiment, the additional storage nodes may be written to concurrently with step 450 according to instructions sent by the OAS to the particular storage nodes. In another embodiment, the additional storage nodes may be selected by the initial or primary storage node such that the primary storage node sends replication instructions to one or more additional storage nodes. The successful write notice described in block 460 may, in various embodiments, be provided when the primary storage node is written to or after the primary storage node and all replicated storage nodes are written to, depending on the configuration. In various embodiments, replication may be performed synchronously, that is, completed before the write operation is acknowledged; asynchronously, that is, the replicas may be written before, after or during the write of the original or primary copy; or a combination of each. If asynchronous, a second acknowledgement may be provided when each or all of the replicas or copies are written.

Figure 5:
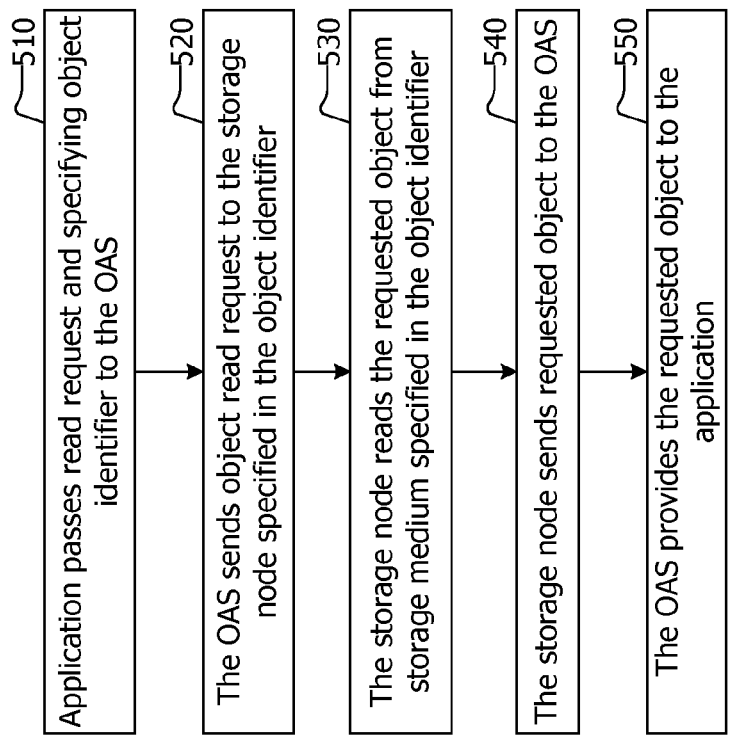
FIG. 5 is a flow chart of the actions taken to read an object stored on an object file system.

FIG. 5 is a flow chart of the actions taken to read an object stored on an object file system. Referring to the embodiment described and shown regarding FIG. 1, an application passes a read request specifying an object identifier to the OAS, as shown in block 510. The OAS sends an object read request to the storage node specified in the object identifier. Refer to the object identifier 300 described above and shown in FIG. 3. The storage node reads the requested object from the storage medium specified in the object identifier, as shown in block 530. The storage node sends the requested object to the OAS, as shown in block 540. The OAS may check to confirm that the unique ID of the object received from the OFS matches the unique ID in the object identifier. If there is no match, the read will fail. In another embodiment, the storage node may perform this check. This check adds a level of security to the read request in that the requesting application will not receive an object from the OAS unless the unique ID in the retrieved object and the read request match. This check prevents applications from obtaining objects by guessing the location ID or other components of the object identifier. This check helps ensure that the OAS is returning the object requested. The OAS provides the requested object to the application, as shown in block 550.

In an embodiment in which replicated copies of objects are stored on multiple storage nodes, the OAS may select to read from the primary storage node or one of the replicated storage nodes. The OAS may select the replicated storage node from which to access the object according to various schemes or a combination of criteria, including, for example, random selection, shortest path/closest, highest speed connection, least accessed storage node, and others. The selection of primary or replicated copy of the object and of which replicated storage node should be accessed is performed by the OAS between steps 510 and 520 of FIG. 5.

Figure 6:
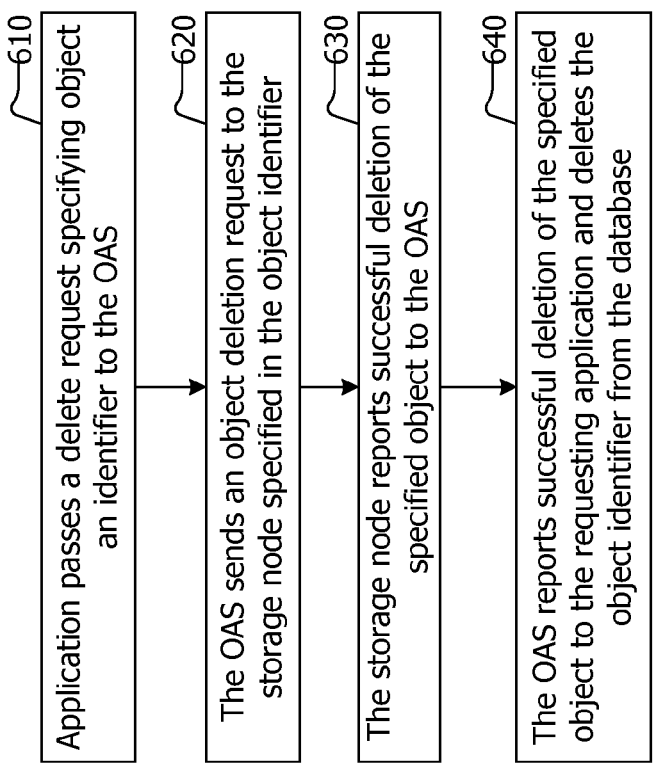
FIG. 6 is a flow chart of the actions taken to delete an object stored on an object file system.

FIG. 6 is a flow chart of the actions taken to delete an object stored on an object file system. Referring to the embodiment described and shown regarding FIG. 1, an application passes a delete request specifying an object identifier to the OAS, as shown in block 610. The OAS sends an object deletion request to the storage node specified in the object identifier, as shown in block 620. The storage node deletes the specified object and reports successful deletion of the specified object to the OAS, as shown in block 630. In one embodiment, before deletion of the specified node, the storage node or the OAS checks to confirm that the unique ID of the object to be deleted and the unique ID in the object identifier included in the delete request match. Only if the unique IDs match, is the object deleted. This check adds a level of security to the delete request in that the requesting application will not delete an object unless the unique ID of the stored object and the delete request match. This check prevents applications from deleting objects by guessing the location ID or other components of the object identifier. This check helps ensure that the specified object is actually the object being deleted. After the object is deleted, the OAS reports successful deletion of the specified object to the requesting application and deletes the object identifier from the database, as shown in block 640.

In an embodiment in which replicated copies of objects are stored on multiple storage nodes, depending on the embodiment, the OAS may send an object deletion instruction to the primary storage node to delete the object, and the primary storage node may then send object deletion instructions to additional storage nodes to delete the replicated copies of the object, as shown in block 620. In another embodiment, the OAS may send object deletion instructions to the primary storage node and the additional storage nodes on which the replicated copies are stored, as shown in block 620.

In one embodiment successful deletion may be reported after the primary storage node has deleted the object or after the primary and all replicated copied have been deleted from additional storage nodes, as shown in blocks 630 and 640.

Figure 7:
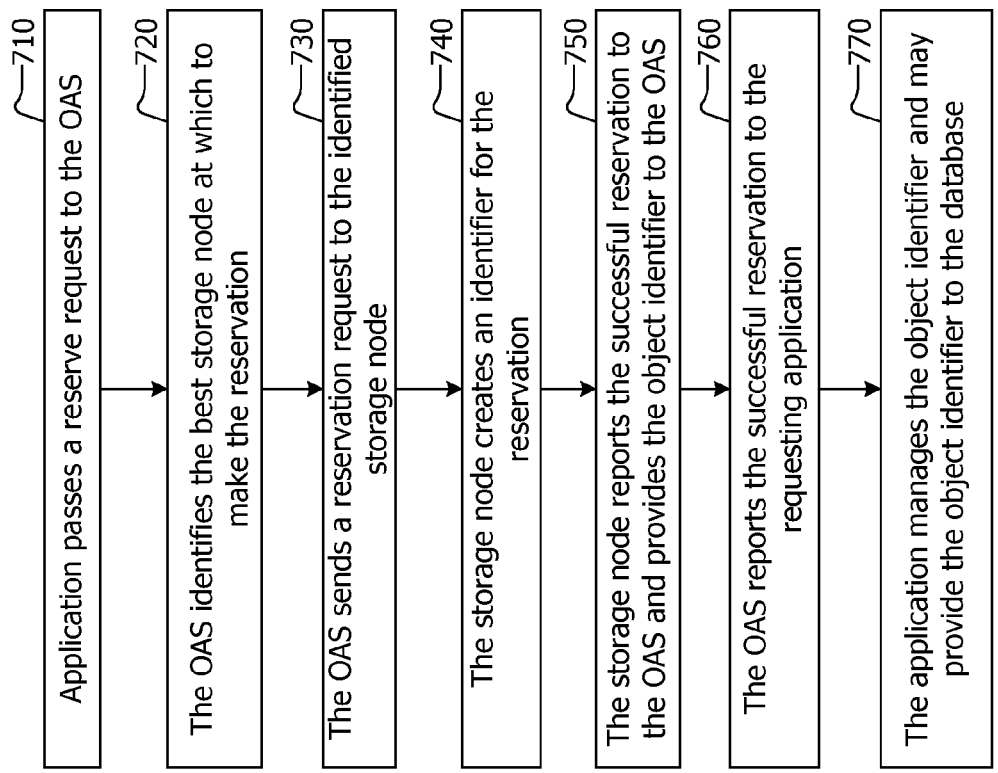
FIG. 7 is a flow chart of the actions taken to reserve space for an object to be stored on an object file system.

FIG. 7 is a flow chart of the actions taken to reserve space for an object to be stored on an object file system. An application passes a reserve request to the OAS, as shown in block 710. The OAS identifies the best storage node at which to make the reservation, as shown in block 720. The OAS sends a reservation request to the identified storage node, as shown in block 730. The storage node creates an identifier for the reservation, as shown in block 740. The storage node reports the successful reservation to the OAS and provides the object identifier to the OAS, as shown in block 750. The OAS reports the successful reservation to the requesting application, as shown in block 760. The application manages the object identifier and may provide the object identifier to the database, as shown in block 770.

Figure 8:
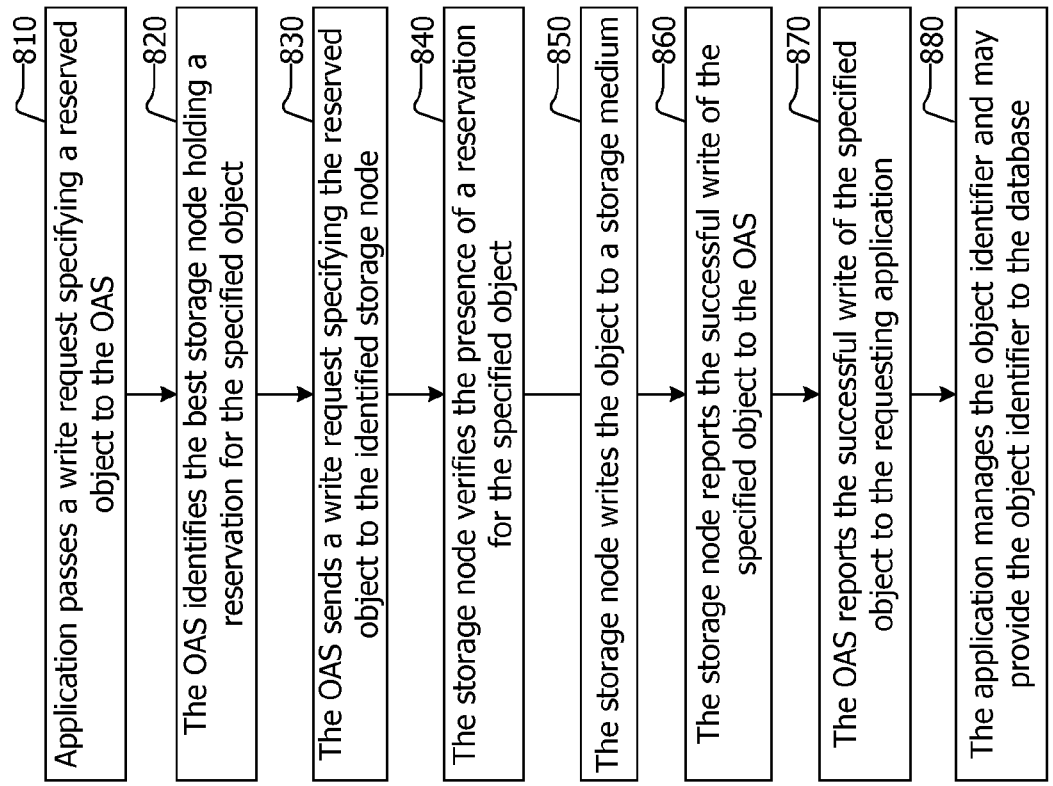
FIG. 8 is a flow chart of the actions taken to implement a reserve write for an object to be stored on an object file system.

FIG. 8 is a flow chart of the actions taken to implement a reserve write (or put) for an object to be stored on an object file system. An application passes a write request specifying a reserved object to the OAS, as shown in block 810. The OAS identifies the best OFS node holding a reservation for the specified object, as shown in block 820. The OAS sends a write request specifying the reserved object to the identified OFS node, as shown in block 830. The OFS node verifies the presence of a reservation for the specified object, as shown in block 840. The OFS node writes the object to a storage medium, as shown in block 850. The OFS node reports the successful write of the specified object to the OAS, as shown in block 860. The OAS reports the successful write of the specified object to the requesting application, as shown in block 870. The application manages the object identifier and may provide the object identifier to the database, as shown in block 880.

Closing Comments

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

As used herein, "plurality" means two or more.

As used herein, a "set" of items may include one or more of such items.

As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

As used herein, "and/or" means that the listed items are alternatives, but the alternatives also include any combination of the listed items.

It is claimed:

1. A method for accessing objects comprising:

object access software on a server receiving from an application program an object write request, the write request including an object comprised of object data and meta data the object access software selecting a best storage node from a plurality of storage nodes on which to store the object including identifying and evaluating among a least busy storage node, a most used storage node and a least full storage node of the plurality of storage nodes the object access software selecting additional storage nodes from the plurality of storage nodes on which to store the object the object access software sending the object and the object write request to the best storage node the object access software sending the object and the object write request to the additional storage nodes the object access software receiving a first write success message from the best storage node, the first write success message including an object identifier, the object identifier including a version identifier, a location identifier and a unique identifier the object access software reporting successful writing of the object to the application program including providing the object identifier to the application program the object access software receiving additional write success messages from the additional storage nodes the object access software recognizing the addition of a new storage node the object access software automatically adapting to the new storage node including redistributing objects from a more full node of the plurality of storage nodes to the new storage node.

2. The method of claim 1 further comprising:

the object access software receiving a read request for a requested object specifying the object identifier the object access software selecting to obtain the requested object from among the best storage node, the new storage node and the additional storage nodes according to criteria including a shortest path, a highest speed connection, and a least accessed.

3. The method of claim 1 wherein each storage node includes a plurality of storage media.

4. The method of claim 3 wherein the storage media are one or more selected from the group including hard disk drives, silicon storage devices and magnetic tape devices.

5. The method of claim 1 wherein each storage node runs a local file system.

6. The method of claim 1 wherein the meta data includes at least one selected from the group including an object creator, object owner, access permissions, and a creation time.

7. The method of claim 1 further comprising:

the object access software storing the object identifier and the meta data for the object in a database.

8. A non-transitory storage medium having instructions stored thereon which when executed by a processor cause the processor to perform actions comprising:

receiving from an application program an object write request, the write request including an object comprised of object data and meta data selecting a best storage node from a plurality of storage nodes on which to store the object including identifying and evaluating among a least busy storage node, a most used storage node and a least full storage node of the plurality of storage nodes selecting additional storage nodes from the plurality of storage nodes on which to store the object sending the object and the object write request to the best storage node sending the object and the object write request to the additional storage nodes receiving a first write success message from the best storage node, the write success message including an object identifier, the object identifier including a version identifier, a location identifier and a unique identifier reporting successful writing of the object to the application program including providing the object identifier receiving additional write success messages from the additional storage nodes recognizing the addition of a new storage node automatically adapting to the new storage node including redistributing objects from a more full node of the plurality of storage nodes to the new storage node.

9. The non-transitory storage medium of claim 8 have further instructions stored thereon which when executed by the processor cause the processor to perform further actions including:

receiving a read request for a requested object specifying the object identifier selecting to obtain the requested object from among the best storage node, the new storage node and the additional storage nodes according to criteria including a shortest path, a highest speed connection, and a least accessed.

10. The non-transitory storage medium of claim 8 wherein each storage node includes a plurality of storage media.

11. The non-transitory storage medium of claim 10 wherein the storage media are one or more selected from the group including hard disk drives, silicon storage devices and magnetic tape devices.

12. The non-transitory storage medium of claim 8 wherein each storage node runs a local file system.

13. The non-transitory storage medium of claim 8 wherein the meta data includes at least one selected from the group including an object creator, object owner, access permissions, and a creation time.

14. The non-transitory storage medium of claim 8 have further instructions stored thereon which when executed by the processor cause the processor to perform further actions including:

storing the object identifier and the meta data for the object in a database.

15. A computing device to manage a plurality of storage arrays of storage devices, the computing device comprising:

a processor;

a memory coupled with the processor;

a storage medium having instructions stored thereon which when executed cause the computing device to perform actions comprising:

receiving from an application program an object write request, the write request including an object comprised of object data and meta data selecting a best storage node from a plurality of storage nodes on which to store the object including identifying and evaluating among a least busy storage node, a most used storage node and a least full storage node of the plurality of storage nodes selecting additional storage nodes from the plurality of storage nodes on which to store the object sending the object and the object write request to the best storage node sending the object and the object write request to the additional storage nodes receiving a first write success message from the best storage node, the write success message including an object identifier, the object identifier including a version identifier, a location identifier and a unique identifier reporting successful writing of the object to the application program including providing the object identifier receiving additional write success messages from the additional storage nodes recognizing the addition of a new storage node automatically adapting to the new storage node including redistributing objects from a more full node of the plurality of storage nodes to the new storage node.

16. The computing device of claim 15 wherein the storage medium has further instructions stored thereon which when executed cause the computing device to perform further actions comprising:

receiving a read request for a requested object specifying the object identifier selecting to obtain the requested object from among the best storage node, the new storage node and the additional storage nodes according to criteria including a shortest path, a highest speed connection, and a least accessed.

17. The computing device of claim 15 wherein each storage node includes a plurality of storage media.

18. The computing device of claim 17 wherein the storage media are one or more selected from the group including hard disk drives, silicon storage devices and magnetic tape devices.

19. The computing device of claim 15 wherein each storage node runs a local file system.

20. The computing device of claim 15 wherein the meta data includes at least one selected from the group including an object creator, object owner, access permissions, and a creation time.

21. The computing device of claim 15 wherein the storage medium has further instructions stored thereon which when executed cause the computing device to perform further actions comprising:

storing the object identifier and meta data for the object in a database.

* * * * *